Dec. 9, 1930. J. RATTO 1,784,750
EMERGENCY BRAKE LEVER AND LOCK
Filed Oct. 26, 1928 2 Sheets-Sheet 1
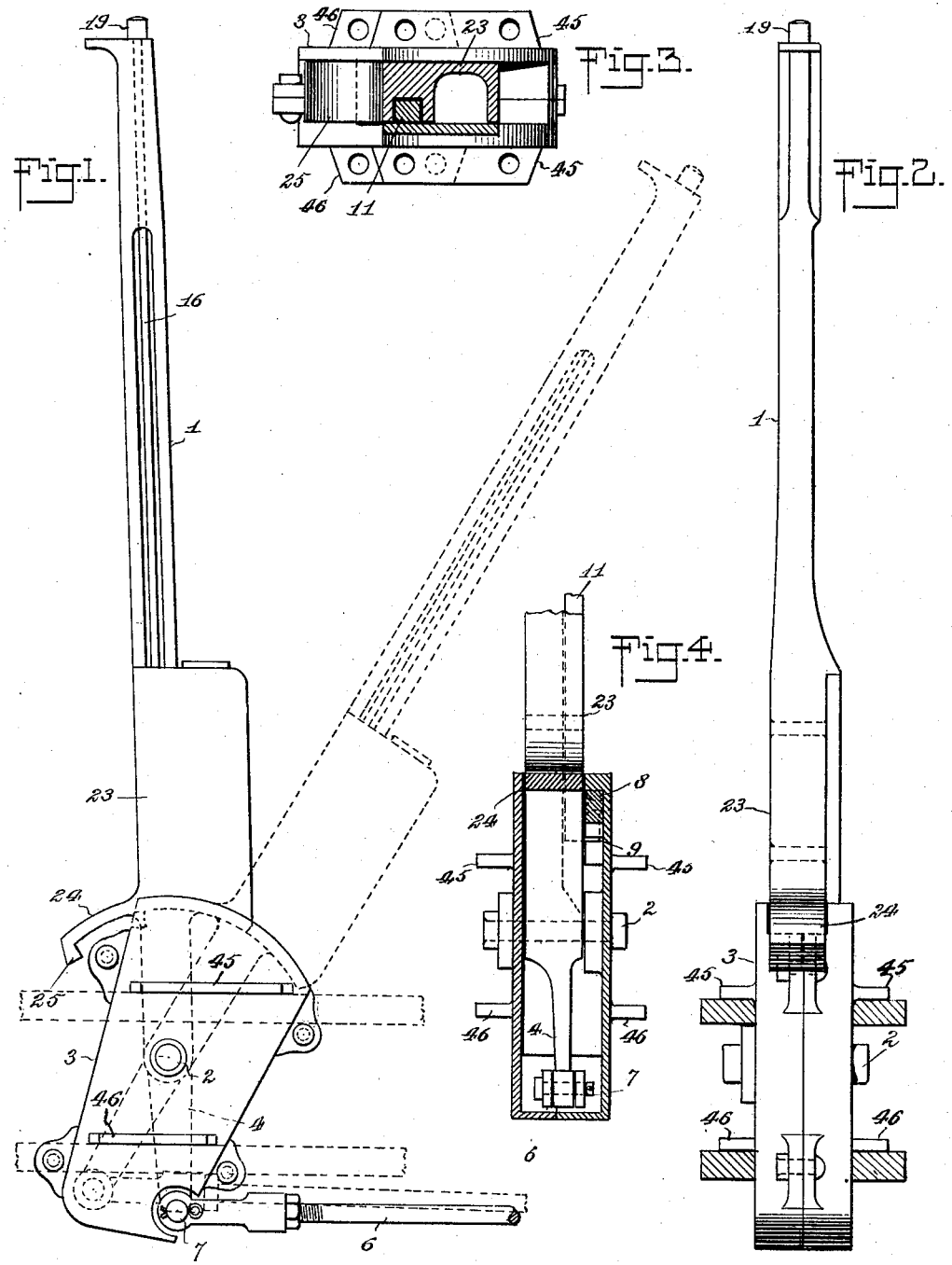
WITNESSES
INVENTOR
Joseph Ratto
BY
ATTORNEY Dec. 9, 1930.  J. RATTO  1,784,750
EMERGENCY BRAKE LEVER AND LOCK
Filed Oct. 26, 1928   2 Sheets-Sheet 2
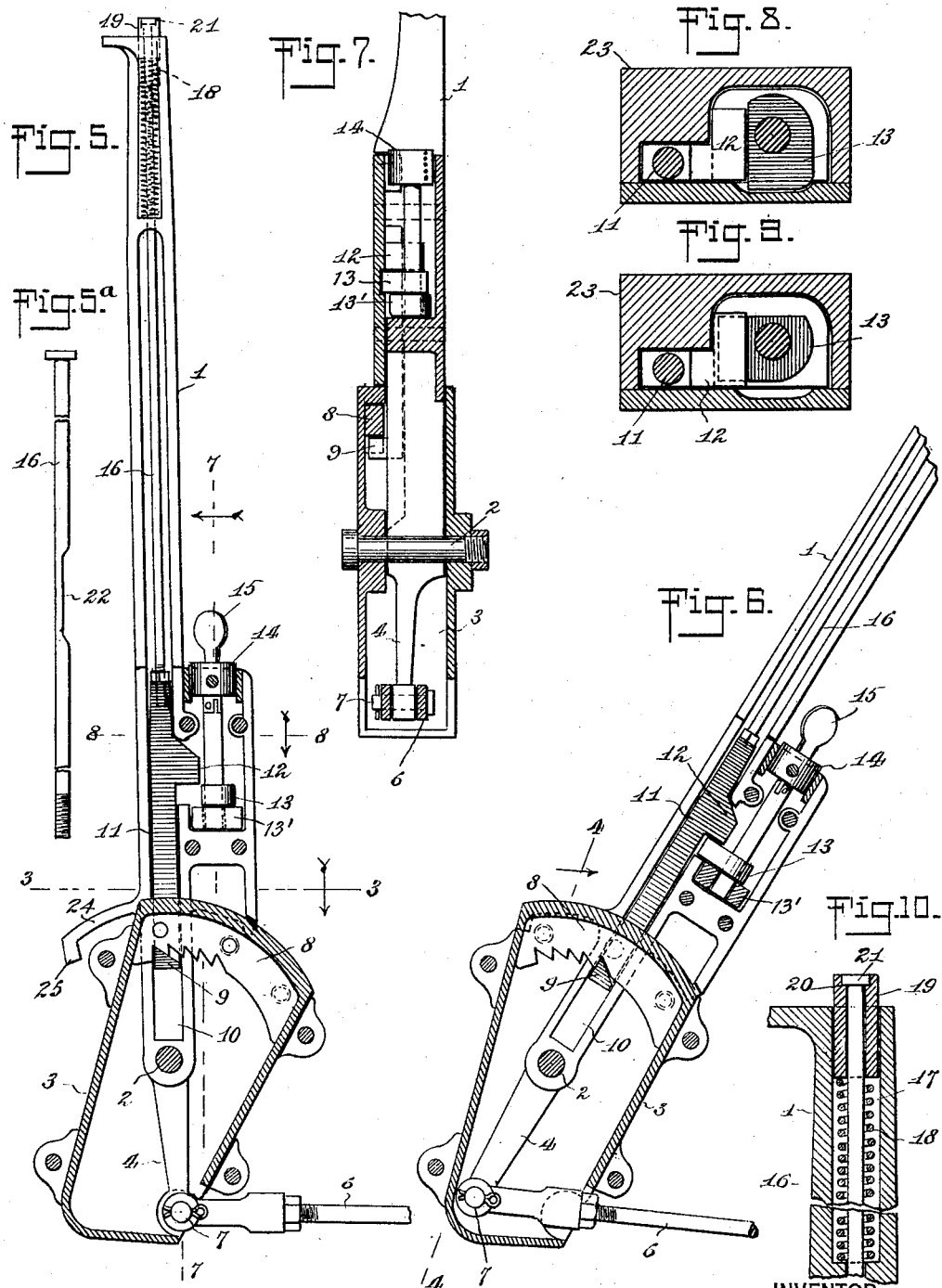
WITNESSES
William P. Goebel
A. L. Kitchin
INVENTOR
Joseph Ratto.
BY
ATTORNEY Patented Dec. 9, 1930

1,784,750

UNITED STATES PATENT OFFICE

JOSEPH RATTO, OF BROOKLYN, NEW YORK

EMERGENCY-BRAKE LEVER AND LOCK

Application filed October 26, 1928. Serial No. 315,175.

This invention relates to a lever construction and means for locking the same, the object being to provide a structure particularly adapted for locks for automobiles, whereby the lever may be easily actuated at any time and also easily locked whenever desired.

Another object of the invention is to provide a lock and also a lever for emergency brakes of automobiles, wherein the moving parts of the lever are housed and a key-operated lock is provided and arranged to lock the moving parts against actuation whenever the key lock mechanism has been caused to function.

A further object of the invention is to provide a locking mechanism for old types of emergency brake levers, wherein a key operated mechanism may be attached to the lever and operated at any time to lock the lever against release.

An additional object of the invention is to provide a device which is an improvement over my Patent No. 1,487,603 issued March 18, 1924.

In the accompanying drawings,—

Figure 1 is a side view of an emergency brake lever and a lock associated therewith, said lever and lock embodying certain features of the invention;

Figure 2 is an edge view of the structure shown in Figure 1;

Figure 3 is a sectional view through Figure 5 on the line 3—3;

Figure 4 is a fragmentary sectional view through Figure 6 on the line 4—4;

Figure 5 is a vertical sectional view through the structure shown in Figure 1, the upper parts being shown in elevation;

Figure 5a is a detail fragmentary view showing the rod in Figure 5 formed with a weakened portion;

Figure 6 is a view of the lower parts of the structure shown in Figure 5, the same being shown in a locked or operated position;

Figure 7 is a fragmentary sectional view through Figure 5 on the line 7—7;

Figure 8 is a transverse sectional view through Figure 5 on the line 8—8;

Figure 9 is a view similar to Figure 8 but showing the key operated lock mechanism moved to a locked position;

Figure 10 is a fragmentary sectional view through the upper part of the lever shown in Figure 5 illustrating the spring and rod protecting sleeve.

Referring to the accompanying drawings by numerals, 1 indicates a lever particularly adapted for emergency brakes for automobiles. This lever is pivotally mounted at 2 on casing 3, which casing is bolted or otherwise rigidly secured to the body of an automobile in any desired manner. An extension 4 is provided at the lower end of the lever 1, which extension is pivotally connected with the pull rod 6 of hard steel substantially incapable of being cut. It will be noted that the pivotal pin 7 forming a connection between extension 4 and rod 6 is drawn into the casing 3 when the lever 1 has been moved to an operated or locked position. This will prevent anyone from pulling out pin 7 for disconnecting the parts. A rack 8 is arranged interiorly of the casing 3 and coacting with this rack is a catch 9 slidably mounted in the slot 10 of lever 1. The catch 9 is preferably an integral extension of the sliding block 11, which block is provided with an extending abutment 12 adapted to receive the locking bolt 13 of the key-operated mechanism 14. Key 15 when turned in one position will move the bolt 13 to a locked position, as shown in Figures 6 and 9, and when turned to a second position will move the bolt 13 to an unlocked position, as shown in Figures 5 and 8. A rod 16 is screwed into or otherwise secured to the block 11, said rod extending upwardly to a point normally above lever 1, as shown in Figure 5. Lever 1 at the upper end is provided with a bore 17 (Figure 10) accommodating the spring 18 and also the sleeve 19 which is rotatably mounted thereon. This sleeve is cut away at 20 for receiving the enlarged head 21 of the rod 16, whereby access to the end of the rod cannot be secured and the sleeve 19 cannot be accidently lost or removed by anyone. When the catch 9 is to be released the operator forces the sleeve 19 and rod 16 downwardly, but as soon as pressure is relieved spring 18 will return the parts to their former position. When the parts are locked, as shown in Figure 6, rod 16 cannot be depressed, and in order to prevent anyone from striking the end 21 with a hammer to attempt to force the parts downwardly, rod 16 substantially centrally thereof is provided with a weakened portion 22, as shown in Figure 5a. If a hammer is used in an attempt to drive the rod 16 downwardly, said rod will bend at the weakened portion 22, and consequently, the locking bolt 13 and other parts will not be injured. This is usually an unnecessary precaution, as the construction of the lock is such that it can resist substantially any blow of a hammer. It will also be noted that the bearing block 13' shown particularly in Figures 5 and 6 acts to hold the parts of the lock in proper alignment so that all parts will properly function and withstand any pressure which may be brought thereon. In forming the lever 1 the same is provided with an enlargement 23 which covers the upper part of the block 11 and most of the lock 14. The lever 1 is also provided with an extension 24 having a depending portion 25. These latter parts are intended to cover the casing 3 when the lever 1 and associated parts have been moved to the position shown in Figure 6. This will prevent anyone from inserting an instrument into the casing 3 for the purpose of dislodging catch 9 or breaking any parts. When mounting the device on an automobile it may be secured in place in slightly different ways according to the particular make of the automobile. Usually the flanges 45 and 46 are riveted or otherwise rigidly secured to certain longitudinal bars especially provided and these longitudinal bars are secured in any desired manner to transverse bars secured to the chassis or other part of the automobile. In this way the emergency lever may be locked at any desired point and held in position against removal or successful tampering.

In operation the parts are normally in the position shown in Figures 1 and 5. When it is desired to apply the emergency brake lever 1 is grasped and pulled until it assumes the position shown in Figure 6. If the driver is not going to leave the car but wishes to proceed he may immediately press downwardly on the rod against the action of spring 18 and easily release the catch 9 so that the lever 1 may be swung back to its first position and the brake released. If the driver should desire to leave the car he will leave the lever in the position shown in Figure 6 and will turn the key 15 so that lock 14 will cause the bolt 13 to move to locked position, as shown in Figures 6 and 9. Key 15 is then removed and the emergency brake is locked against release. When the driver returns he uses key 15 to turn the bolt 13 back to the position shown in Figure 5. The lever then may be released and again operated in the usual manner.

Also, I would state that while the illustrated examples constitute practical embodiments of my invention, I do not limit myself strictly to the exact details herein illustrated, since manifestly the same can be considerably varied without departing from the spirit of the invention.

It will also be understood that the emergency brake lever and lock set forth has been designed for motor vehicles which are to be constructed or which are in the course of construction, but may be, if desired, installed on every type of motor vehicle now in use. When this is done the old emergency brake lever is removed and the new brake lever and associated parts are substituted, and after the substitution has taken place the new lever functions in the manner set forth. This functioning includes the proper action of the parts at all times to maintain the lever always in condition for use. The key 15 is capable of being removed when the parts are in a locked or unlocked position. This will prevent anyone, as for instance, children, from rotating the key and causing an inadvertent locking of the parts. Such an action would naturally be objectionable, as it would prevent the driver from applying the brake in a case of emergency. Also, the fact that the key may be removed results in preventing the lock from functioning by reason of the vibration of the car while running. It will be understood that the structure shown in Figure 1 is designed to prevent both accidents and theft but is especially adapted to prevent children from releasing the emergency brake when a driver is absent from the automobile. Quite often trucks and other automobiles are left on an incline with the emergency brake properly applied. Many times children in their play have released the emergency brake and caused accidents by reason of the drifting of the automobile down the incline. By providing means for locking the emergency brake in a locked position no one can release the brake until key 15 has been utilized to unlock the brake lever.

What I claim is:—

1. An emergency brake lever and lock, including a swinging lever, a rack, a housing for said rack, means carried by the lever for closing the opening in the housing, a catch carried by the lever, manually-actuated means for moving the catch to disengaged position, and key-operated means for locking the catch against actuation.

2. An emergency brake lever and lock, including a lever member, a catch slidably mounted on the lever member, a rack coacting with said catch, a casing enclosing said rack, said casing having a slot through which said lever projects, means carried by the lever for locking the catch in a locked position, and a covering member carried by the member for covering that part of said slot not occupied by said lever.

3. An emergency brake lever and lock, including a lever, a catch and catch block slidably carried by the lever, a rack coacting with the catch, a casing for said rack, said casing enclosing part of the lever, the casing having a slot whereby said lever may swing back and forth, a key-operated locking mechanism for locking said block against movement, and a lock casing enclosing said key-operated lock and said block, said lock casing having an extension positioned to close said slot when said lever has been moved to an operated position.

4. An emergency brake lever and lock, including a lever member, a sliding block carried by said lever member adapted to slide longitudinally of said lever, a spring for moving the block in one direction, hand-operated means for moving the block in the opposite direction, a catch carried by said block, a fixed rack coacting with said catch, and a key-operated lock positioned to lock the block against movement in one direction whereby said lever member cannot function.

Signed at New York, in the county of New York and State of New York, this 23rd day of October, A. D. 1928.

JOSEPH RATTO.